United States Patent
Du

(10) Patent No.: US 10,872,217 B2
(45) Date of Patent: Dec. 22, 2020

(54) FINGERPRINT SENSOR AND ELECTRONIC TERMINAL

(71) Applicant: SHENZHEN GOODIX TECHNOLOGY CO., LTD., Shenzhen (CN)

(72) Inventor: Canhong Du, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 105 days.

(21) Appl. No.: 16/139,025

(22) Filed: Sep. 22, 2018

(65) Prior Publication Data
US 2019/0026521 A1    Jan. 24, 2019

Related U.S. Application Data

(63) Continuation of application No. PCT/CN2016/106588, filed on Nov. 21, 2016.

(51) Int. Cl.
*G06K 9/00* (2006.01)
*G06K 9/20* (2006.01)

(52) U.S. Cl.
CPC .......... *G06K 9/0002* (2013.01); *G06K 9/209* (2013.01); *G06K 9/0051* (2013.01)

(58) Field of Classification Search
CPC .... G06K 9/0002; G06K 9/209; G06K 9/0051; G06K 9/00–0012; G06F 3/041–047; G01R 27/26–2605
See application file for complete search history.

(56) References Cited

U.S. PATENT DOCUMENTS

| | | | |
|---|---|---|---|
| 2013/0271422 A1* | 10/2013 | Hotelling | G06F 3/044 345/174 |
| 2013/0314148 A1* | 11/2013 | Kang | G06K 9/0002 327/517 |

(Continued)

FOREIGN PATENT DOCUMENTS

| | | |
|---|---|---|
| CN | 101727575 A | 6/2010 |
| CN | 102954753 A | 3/2013 |

(Continued)

OTHER PUBLICATIONS

Anonymous: "Switching Regulator Basics: Bootstrap | Basic KNowledge | Rohm Tech Web: Technical Information Site of Power Supply Design", Feb. 15, 2016, XP05557752, Retrieved from the Internet: https://micro.rohm.com/en/techweb/knowledge/dcdc/dcdc_sr/dcdc_sr01/829 (retrieved on Apr. 4, 2019), 3 pages total.

*Primary Examiner* — Roberto W Flores

(57) ABSTRACT

A fingerprint sensor and an electronic terminal are provided. The fingerprint sensor includes: a fingerprint sensor chip and a floating ground control circuit. The fingerprint sensor chip includes a sensor array including a plurality of sensing electrodes and a driver. The sensing electrode in the sensor array is configured to form a fingerprint capacitor with a finger. The driver is configured to output a driving signal to the floating ground control circuit. The fingerprint sensor chip includes a sensor power supply end and a sensor ground. The sensor power supply end and the sensor ground are connected to the floating ground control circuit and are respectively configured to receive a high potential and a low potential output by the floating ground control circuit. The output high potential and low potential substantially synchronously vary to maintain a substantially constant voltage which is supplied to the fingerprint sensor chip.

15 Claims, 5 Drawing Sheets

(56) References Cited

U.S. PATENT DOCUMENTS

| | | | |
|---|---|---|---|
| 2015/0015537 A1 | 1/2015 | Riedijk et al. | |
| 2015/0070079 A1* | 3/2015 | Yang | G06K 9/0002 327/517 |
| 2016/0180138 A1 | 6/2016 | Riedijk | |
| 2016/0364595 A1 | 12/2016 | Du et al. | |
| 2019/0005291 A1* | 1/2019 | Xu | G06K 9/0002 |

FOREIGN PATENT DOCUMENTS

| | | |
|---|---|---|
| CN | 103376970 A | 10/2013 |
| CN | 103714330 A | 4/2014 |
| CN | 104573649 A | 4/2015 |
| CN | 105378755 A | 3/2016 |
| CN | 105706110 A | 6/2016 |
| CN | 106130526 A | 11/2016 |
| EP | 2650823 A2 | 10/2013 |
| EP | 2650823 A3 | 10/2013 |
| WO | 2015/135578 A1 | 9/2015 |
| WO | 2016/106943 A1 | 7/2016 |

\* cited by examiner

FINGERPRINT SENSOR AND ELECTRONIC TERMINAL

CROSS-REFERENCE TO RELATED APPLICATIONS

The present application is a continuation of international application No. PCT/CN2016/106588 filed on Nov. 21, 2016, which is hereby incorporated by reference in its entirety.

TECHNICAL FIELD

Embodiments of the present disclosure relate to the technical field of biological feature identification, and in particular, relate to a fingerprint sensor and an electronic terminal.

BACKGROUND

Fingerprints are invariable, unique and convenient, which thus provide a high-level identity security authentication. During the identity security authentication, fingerprint sensors are generally used as devices for automatically acquiring the fingerprints.

Fingerprint sensors are mainly categorized into optical fingerprint sensors, semiconductor capacitive sensors, semiconductor thermo sensitive sensors, semiconductor pressure sensitive sensors, ultrasound sensors and radio frequency (RF) sensors and the like.

Using a semiconductor capacitive fingerprint sensor as an example, on a "flat panel" where thousands of semiconductor devices are integrated, another electrode sheet of a capacitor is formed when a finger is attached on the "flat panel". Since the surface of the finger is concave and convex and is not smooth, the convex points correspond to ridges and the concave points correspond to valleys, such that the actual distance from the convex points to the flat panel is different from the actual distance from the concave points to the flat panel. As such, values of the formed capacitances are different. The acquired values of the different capacitances are collected by a device, and thus fingerprints are acquired.

However, when the above fingerprint sensor is applied to a practical product, generally a cover needs to be arranged on the surface of the fingerprint sensor. Due to presence of the cover, an effective distance from the finger to the fingerprint sensor is enlarged, and as a result, electrical signals for detecting the ridges and valleys in different fingerprint regions are slightly different from each other. As such, signal-to-noise ratio (SNR) of a fingerprint detection image is low.

SUMMARY

Embodiments of the present disclosure are intended to provide a fingerprint sensor and an electronic terminal, to at least solve the above technical problem in the prior art.

To achieve the above objective, embodiments of the present disclosure provides a fingerprint sensor. The fingerprint sensor includes: a fingerprint sensor chip and a floating ground control circuit; where the fingerprint sensor chip comprises a sensor array having a plurality of sensing electrodes and a driver, the sensing electrode in the sensor array being configured to form a fingerprint capacitor with a finger, and the driver being configured to output a driving signal to the floating ground control circuit; the fingerprint sensor chip includes a sensor power supply end and a sensor ground, the sensor power supply end and the sensor ground being connected to the floating ground control circuit and being respectively configured to receive a high potential and a low potential output by the floating ground control circuit; the floating ground control circuit includes a switch circuit, and is configured to control ON and OFF states of the switch circuit according to the driving signal such that the output high potential and low potential are variable relative to a device reference potential, and the high potential and the low potential output by the floating ground control circuit substantially synchronously vary to maintain a substantially constant voltage which is supplied to the fingerprint sensor chip.

Embodiments of the present disclosure further provide an electronic terminal. The electronic terminal includes the above described fingerprint sensor.

In embodiments of the present disclosure, the fingerprint sensor chip includes a fingerprint sensor and an electronic terminal. The fingerprint sensor includes: a fingerprint sensor chip and a floating ground control circuit. The fingerprint sensor chip includes a sensor array including a plurality of sensing electrodes and a driver. The sensing electrode in the sensor array is configured to form a fingerprint capacitor with a finger. The driver is configured to output a driving signal to the floating ground control circuit. The fingerprint sensor chip includes a sensor power supply end and a sensor ground. The sensor power supply end and the sensor ground are connected to the floating ground control circuit and are respectively configured to receive a high potential and a low potential output by the floating ground control circuit. The output high potential and low potential output by the floating ground control circuit are variable relative to a device reference potential, and the high potential and the low potential output by the floating ground control circuit substantially synchronously vary to maintain a substantially constant voltage which is supplied to the fingerprint sensor chip. This finally increases amplitude of the driving signal, improves signal-to-noise ratio of a fingerprint image and overcomes the defect that presence of a cover consequently results in a low signal-to-noise ratio of the fingerprint image in the prior art.

DETAILED DESCRIPTION

Practice of the present application is described in detail with reference to drawings and specific embodiments, such that the practice of addressing the technical problem using the technical means according to the present application and achieving the technical effects may be better understood and conducted.

Figure 1:
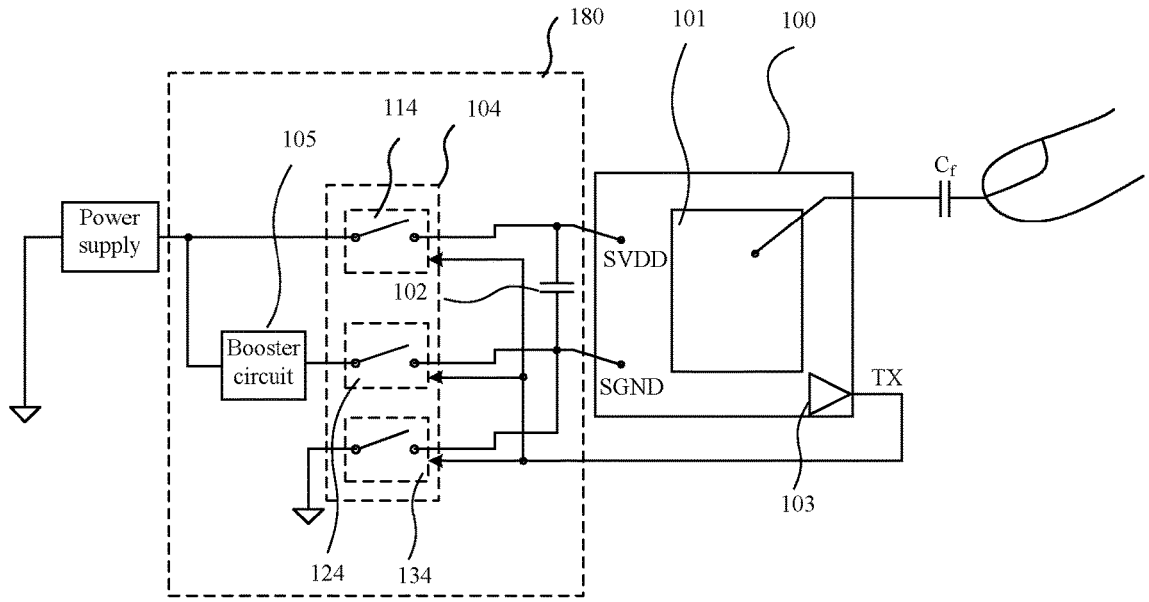
FIG. 1 is a schematic structural diagram of a fingerprint sensor according to the first embodiment of the present disclosure.

FIG. 1 is a schematic structural diagram of a fingerprint sensor according to the first embodiment of the present disclosure. As illustrated in FIG. 1, the fingerprint sensor includes a fingerprint sensor chip 100 and a floating ground control circuit 180. The fingerprint sensor chip 100 includes a sensor array 101 having a plurality of sensing electrodes, and a driver 103.

The sensing electrode in the sensor array 101 is configured to form a fingerprint capacitor Cf with a finger. In this embodiment, the driver 103 is connected to the floating ground control circuit 180, and configured to output a driving signal (or referred to as an exciting signal) TX to the floating ground control circuit 180. In addition, the fingerprint sensor chip 100 further includes a sensor power supply end (sensor VDD, referred to as SVDD) and a sensor ground (referred to as SGND), which are connected to the floating ground control circuit 180 and respectively configured to receive a high potential and a low potential output by the floating ground control circuit 180. The high potential and the low potential output by the floating ground control circuit 180 are variable relative to a device reference potential GND (that is, a device ground), and the high potential and the low potential output by the floating ground control circuit substantially synchronously vary to maintain a substantially constant voltage which is supplied to the fingerprint sensor chip 100.

It should be understood that the high potential in the present application is defined relative to the low potential. That is, the low potential of the sensor ground SGND merely refers to that the potential is a low level relative to the high potential received by the sensor power supply end SVDD, and the low potential may also include, for example, a 12V high voltage signal in practical product implementations.

The floating ground control circuit 180 mainly includes an energy storage capacitor 102, a switch circuit 104 and a booster circuit 105. The floating ground control circuit 180 is configured to receive the driving signal TX from the driver 103 to control ON and OFF states of the switch circuit 104, such that the low potential supplied to the sensor ground SGND is variable relative to the device ground GND, that is, the level of the sensor ground SGND is floating variable.

Specifically, the booster circuit 105 is connected to a power supply, and configured to boost a voltage (for example, 3V) output by the power supply and generate a high voltage signal (for example, 12V). The switch circuit 104 is connected between the power supply and the sensor power supply end SVDD in one aspect, and connected between the booster circuit 105 and the sensor ground SGND in another aspect. The switch circuit 104 periodically outputs the voltage output by the power supply to the sensor power supply end SVDD by means of ON and OFF states switchover of the switch, and periodically supplies the high voltage signal output by the booster circuit 105 to the sensor ground SGND by means of ON and OFF states switchover of the switch, to implement a high voltage floating sensor ground SGND. The energy storage capacitor 102 is connected between the sensor power supply end SVDD and the sensor ground SGND, and mainly configured to enable the low potential supplied to the sensor ground SGND and the high potential supplied to the sensor power supply end SVDD substantially to synchronously vary, to supply the substantially constant voltage to the fingerprint sensor chip 100.

In this embodiment, the switch circuit 104 includes a plurality of switches, and a plurality of control signals may be generated from the driving signal TX via conversion, which are respectively configured to control ON and OFF states of the plurality of switches, such that the low potential supplied to the sensor ground SGND and the high potential supplied to the sensor power supply end SVDD synchronously vary.

Specifically, in the embodiment as illustrated in FIG. 1, the switch circuit 104 may include three switches: a first switch 114, a second switch 124 and a third switch 134. The first switch 114 is arranged between the power supply and the sensor power supply end SVDD. The second switch 124 is arranged between the booster circuit 105 and the sensor ground SGND. The third switch 134 is arranged between the device ground GND and the sensor ground SGND. In addition, the driving signal TX may be processed into a first control signal, a second control signal and a third control signal via conversion, which are respectively configured to control ON and OFF states of the first switch 114, the second switch 124 and the third switch 134. The first control signal and the third control signal may control the first switch 114 and the third switch 134 to switch ON and OF synchronously, and the second control signal may control the second switch 124 to switch ON and OFF. The ON and OFF states of the second switch 124 and those of the third switch 134 are opposite, such that the low potential supplied to the sensor ground SGND is variable relative to the device ground GND, and the high potential and the low potential supplied to the sensor power supply end SVDD synchronously vary.

Specifically, when the first switch 114 and the third switch 134 are simultaneously turned on, the second switch 124 is turned off. In this case, the sensor power supply end SVDD is connected to the power supply and receives a voltage (for example, 3V) supplied by the power supply, and the sensor ground SGND is connected to the device ground GND. Therefore, the sensor ground SGND is pulled down to the device ground GND, and the high potential of the sensor power supply end SVDD and the low potential of the sensor ground SGND maintains a voltage (that is, 3V) substantially consistent with the voltage from the power supply. When the first switch 114 and the third switch 134 are simultaneously turned off and the second switch 124 is turned on, the sensor ground SGND is connected to the booster circuit and configured to receive a high voltage signal (for example, 12V) output by the booster circuit. In this case, the low potential of the sensor ground SGND transitions from the device ground GND to the high voltage signal. In the meantime, since a voltage difference between two terminals of the energy storage capacitor 102 may not abruptly change, the high potential of the sensor power supply end SVDD may be pulled up to a sum (for example, 15V) of the voltage and the high voltage signal, such that the high potential of the sensor power supply end SVDD and the low potential of the sensor ground SGND still maintain the voltage (that is, 3V) consistent with the voltage from the power supply.

Figure 6:
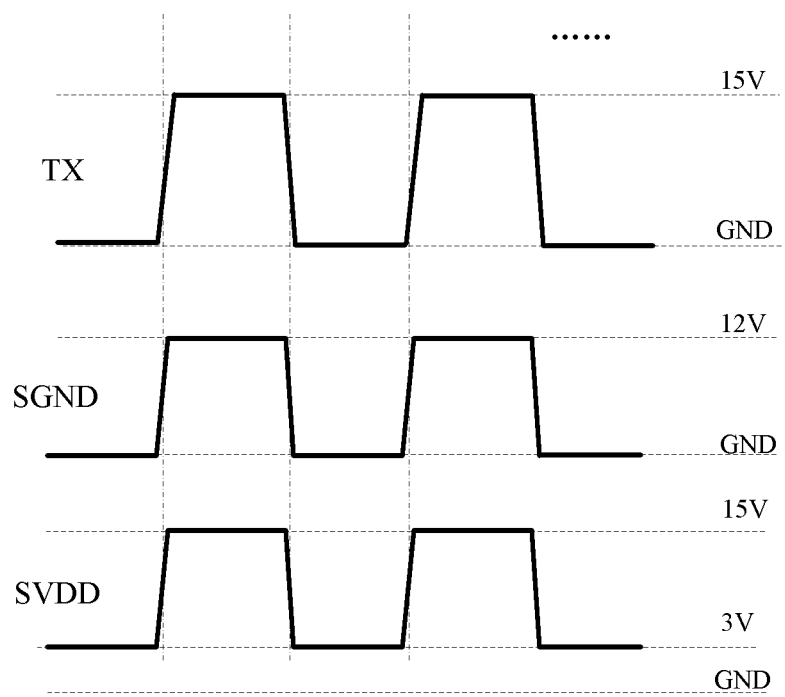
FIG. 6 is a schematic diagram of level variations of a driving signal TX, a sensor ground SGND and a power supply input terminal SVDD according to the above embodiments of the present disclosure.

In the process that the first control signal, the second control signal and the third control signal control the first switch 114, the second switch 124 and the third switch 134 and the process that the ON and OFF states of the first switch 114, the second switch 124 and the third switch 134 are switched over, level variations of the driving signal TX, the sensor ground SGND, and the sensor power supply end SVDD may be referenced to the detailed interpretation about FIG. 6.

Figure 2:
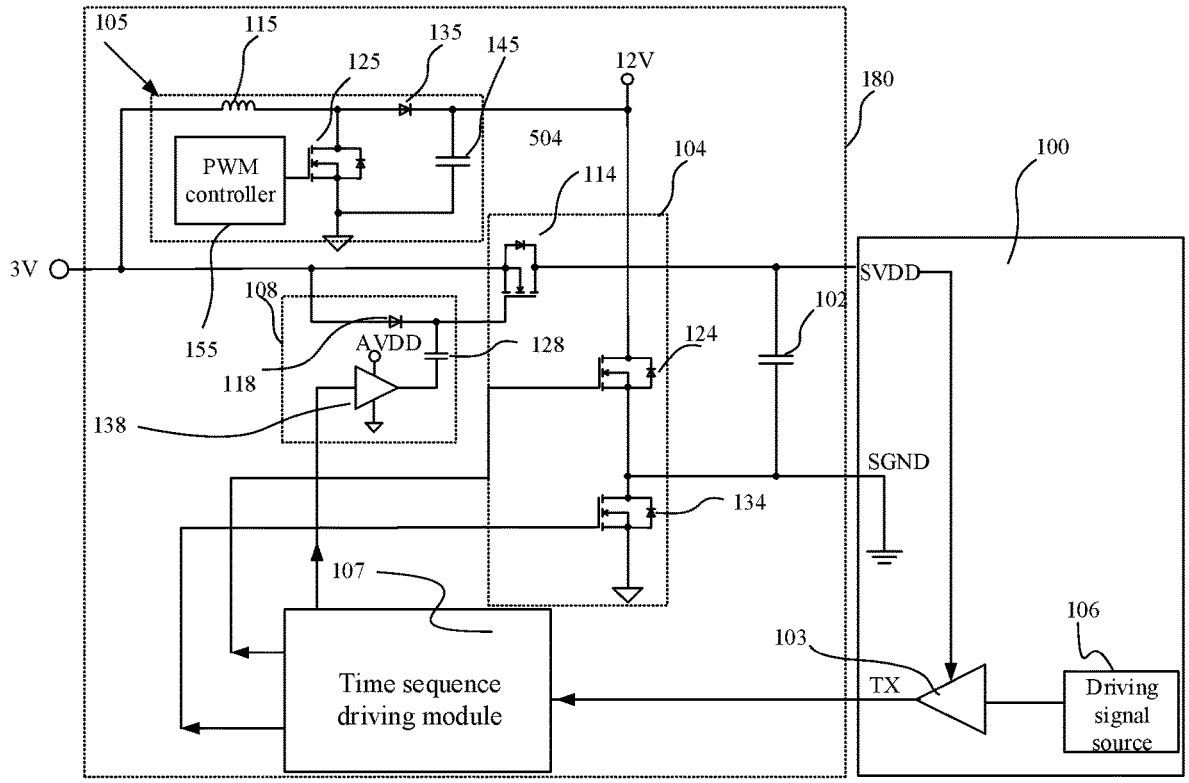
FIG. 2 is a schematic structural diagram of a fingerprint sensor according to the second embodiment of the present disclosure.

FIG. 2 is a schematic structural diagram of a fingerprint sensor according to the second embodiment of the present disclosure. As illustrated in FIG. 2, in this embodiment, the fingerprint sensor includes a fingerprint sensor chip 100 and a floating ground control circuit 180. The fingerprint sensor chip 100 has a sensor power supply end SVDD and a sensor ground SGND, and includes a sensor array (not shown in the drawings), a driver 103 and a driving signal source 106. The driving signal source generates a driving signal TX and outputs the generated driving signal TX to the floating ground control circuit 180 via the driver 103.

The floating ground control circuit 180 includes a switch circuit 104, a booster circuit 105, a time sequence driving module 107, a bootstrap driving circuit 108 and an energy storage capacitor 102.

The booster circuit 105 may be a switch direct-current booster circuit, for example, a Boost circuit, which includes an inductor 115, a switch transistor 125, a diode 135, a filter capacitor 145 and a PWM controller 155. Referring to FIG. 2, in the booster circuit 105, the PWM controller 155 is configured to generate a pulse width modulation signal and output the pulse width modulation signal to the switch transistor 125 to control ON and OFF states of the switch transistor 125. The switch transistor 125 may be a MOS transistor, where a gate of the MOS transistor is connected to the PWM controller 125, and a source of the MOS transistor is connected to a device ground GND; and a drain of the switch transistor 125 is connected to a power supply via the inductor 115 in one aspect, and connected to a anode of the diode 135 in another aspect. A cathode of the diode 135 serves as an output terminal of the booster circuit 105, and is connected to the switch circuit 104 and connected to the device ground GND via the filter capacitor 145. The power supply may supply a voltage, for example, a 3V voltage as illustrated in FIG. 2, and the booster circuit 105 may convert the 3V voltage into a 12V high voltage signal by means of boosting.

In this embodiment, the time sequence driving module 107 is connected between the driver 103 and the switch circuit 104, and configured to receive the driving signal TX and convert the driving signal TX to generate a plurality of control signals and to respectively control ON and OFF states of the plurality of switches of the switch circuit 104 according to the plurality of control signals. Specifically, the time sequence driving module 107 may be generated by means of time sequence processing of the driving signal TX output by the driver 103, such that three control signals are generated, that is, a first control signal, a second control signal and a third control signal. In addition, the switch circuit 104 includes a first switch 114, a second switch 124 and a third switch 134. The first switch 114, the second switch 124 and the third switch 134 may be all transistor switches, for example, high-speed transistor switches. The time sequence driving module 107 may convert the driving signal TX into the first control signal, the second control signal and the third control signal by means of time sequence processing, and output signals via different control ports to control the ON and OFF states of the first switch 114, the second switch 124 and the third switch 134. The first control signal and the third control signal may control synchronous ON and OFF of the first switch 114 and the third switch 134. The second control signal controls the second switch 124 to switch ON and OFF, and the ON and OFF states of the second switch 124 and those of the first switch 114 are opposite. As described in the above embodiments, in this way, the low potential supplied to the sensor ground SGND is variable relative to the device ground GND, and in combination with the energy storage capacitor 102, the high potential supplied to the sensor power supply end SVDD and the low potential supplied to the sensor ground SGND synchronously vary, such that a substantially constant voltage is maintained between the sensor power supply end SVDD and the sensor ground SGND to supply power to the fingerprint sensor chip 100.

In this embodiment, using the scenario where the first switch 114, the second switch 124 and the third switch 134 are both NMOS transistors as an example, the three switches are hereinafter respectively referred to as a first NMOS transistor 114, a second NMOS transistor 124 and a third NMOS transistor 134.

The bootstrap driving circuit 108 is connected to a gate of the first NMOS transistor 114, and configured to receive a first control signal output by the time sequence driving module 107, and drive the first NMOS transistor 114 according to the first control signal to control ON and OFF states thereof. A source of the first NMOS transistor 114 is connected to the power supply, and configured to receive a voltage (for example, 3V) supplied by the power supply; and a drain of the first NMOS transistor 114 is connected to the sensor power supply end SVDD of the fingerprint sensor chip 100.

Specifically, the bootstrap driving circuit 108 includes a diode 118, a second energy storage capacitor 128 and an amplifier 138. The diode 118 is arranged between the source and the gate of the first NMOS transistor, one terminal of the second energy storage capacitor 128 is connected to the gate of the first NMOS transistor, and the other terminal of the second energy storage capacitor 128 is connected to an output terminal of the amplifier 138. An input terminal of the amplifier 138 is connected to the first control signal at a low level, and configured to convert the first control signal to form a first control signal at a high level.

A gate of the second NMOS transistor 124 is connected to the time sequence driving module 107, and configured to receive a second control signal output by the time sequence driving module 107; a source of the second NMOS transistor 124 is connected to the sensor ground SGND of the fingerprint sensor chip 100; and a drain of the second NMOS transistor 124 is connected to an output terminal of the booster circuit 105 and configured to receive a high voltage signal (12V) output by the booster circuit 105.

A gate of the third NMOS transistor 134 is connected to the time sequence driving module 107, and configured to receive a third control signal output by the time sequence driving module 107; a source of the third NMOS transistor 134 is connected to the device ground GND; and a drain of the third NMOS transistor 134 is connected to the sensor ground SGND of the fingerprint sensor chip 100.

For better understanding of the technical solution according to this present disclosure, the operating process of the fingerprint sensor as illustrated in FIG. 6 is briefly described hereinafter.

When the driving signal TX is at a low level, the time sequence driving module 107 performs time sequence processing for the driving signal TX to obtain a first control signal at a high level, and the bootstrap driving circuit 108 controls the first NMOS transistor 114 to be turned on according to the first control signal at a high level. Since the source of the first NMOS transistor 114 is connected to the power supply, and the drain of the first NMOS transistor 114 is connected to the sensor power supply end SVDD, the first NMOS transistor 114 is turned on, such that the high level of the sensor power supply end SVDD is the voltage (3V) supplied by the power supply.

The time sequence driving module 107 is further configured to process the driving signal TX to obtain a second control signal at a low level, where the second control signal at a low level is output to the second NMOS transistor 124, such that the second NMOS transistor 124 is turned off. Therefore, in this case, the high voltage signal (12V) output by the booster circuit 105 may not be supplied to the sensor ground SGND. The time sequence driving module 107 acquires a third control signal at a high level by means of time sequence conversion, and outputs the third control signal to the gate of the third NMOS transistor 134, such that the third NMOS transistor 134 is turned on. In this case, the sensor ground SGND is connected to the device ground GND via the third NMOS transistor 134. Therefore, a low level of the sensor ground SGND is the device ground GND. That is, when the driving signal TX is at a low level, the supply power supplied by the power supply (3V) is substantially maintained between the sensor power supply end SVDD and the sensor ground SGND.

When the driving signal TX is converted into a high level, the time sequence driving module 107 respectively acquires a first control signal at a low level, a second control signal at high level and a third control signal at a low level via time sequence conversion, and outputs the acquired control signals to the first NMOS transistor 114 via the bootstrap driving circuit 108, such that the first NMOS transistor 114 is turned off. Therefore, the voltage (3V) supplied by the power supply may not be directly supplied to the sensor power supply end SVDD. In this case, the power stored in the energy storage capacitor 102 may be supplied to the sensor power supply end SVDD. The third control signal at a low level controls the third NMOS transistor 134 to be turned off, such that the sensor ground SGND is disconnected from the device ground GND. In the meantime, the second control signal at a high level controls the second NMOS transistor 124 to be turned on, such that the sensor ground SGND is connected to the output terminal of the booster circuit 105 via the second NMOS transistor 124. Therefore, the low level of the sensor ground SGND may transition to the high voltage signal (12V) output by the booster circuit 105. Since the voltage difference at two terminals of the energy storage capacitor 102 may not abruptly change, the high level of the sensor power supply end SVDD may be pulled up to a sum (15V) of the voltage (3V) and the high voltage signal (12V). That is, when the driving signal TX is at a high level, the voltage (3V) supplied by the power supply is still maintained between the sensor power supply end SVDD and the sensor ground SGND.

Accordingly, in the fingerprint sensor according to this embodiment, by virtue of the booster circuit 105 and the switch circuit 104 of the floating ground control circuit 180, the low level of the sensor ground SGND of the fingerprint sensor chip 100 is floating variable between the high voltage signal supplied by the booster circuit 105 and the device ground GND, that is, the high voltage floating ground is implemented; and the high level of the sensor power supply end SVDD of the fingerprint sensor chip 100 and the low level of the sensor ground SGND are substantially synchronously variable. In this way, it is ensured that a substantially constant voltage is maintained between the sensor power supply end SVDD and the sensor ground SGND to supply power to the fingerprint sensor chip 100.

Figure 3:
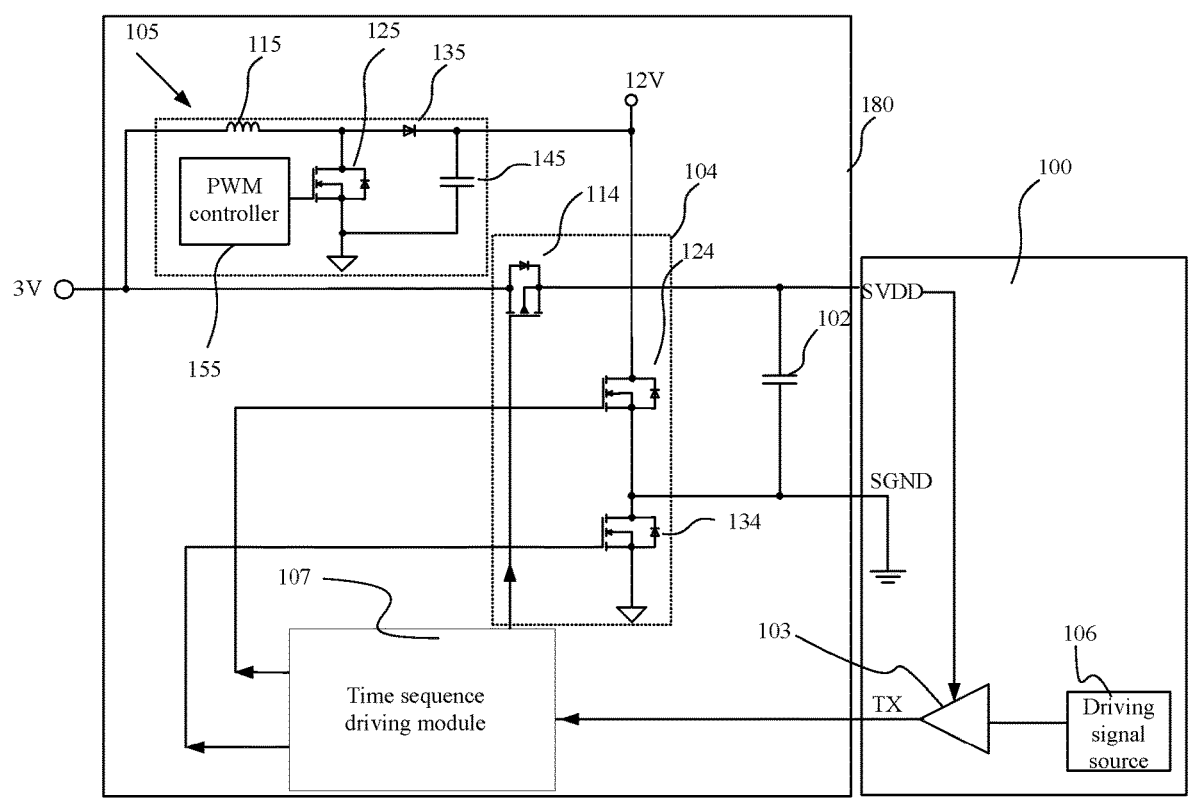
FIG. 3 is a schematic structural diagram of a fingerprint sensor according to the third embodiment of the present disclosure.

FIG. 3 is a schematic structural diagram of a fingerprint sensor according to the third embodiment of the present disclosure. The fingerprint sensor as illustrated in FIG. 3 is similar to that in the embodiment as illustrated in FIG. 2. The difference lies in that, in this embodiment, the first switch 114 is a PMOS transistor, and the second switch 124 and the third switch 134 are still NMOS transistors. A drain of the PMOS transistor is connected to the power supply to receive the voltage (3V), and a source of the PMOS transistor is connected to the sensor power supply end SVDD.

In addition, considering that the time sequence driving module 107 may directly generates a first control signal to control ON and OFF of the PMOS transistor, the bootstrap driving circuit 108 as illustrated in FIG. 2 may be omitted in this embodiment.

Since the first switch 114 in this embodiment is a PMOS transistor, the first control signal provided by the time sequence driving module 107 to the first switch 114 according to the driving signal TX may be correspondingly adjusted, such that the first switch 114 and the third switch 134 are both turned on whereas the second switch 124 is turned off when the driving signal TX is at a low level, and the first switch 114 and the third switch 134 are both turned off whereas the second switch 124 is turned off and when the driving signal TX is at a high level. The specific operating process of the fingerprint sensor as illustrated in FIG. 3 may likewise be referenced to the relevant description in the above embodiments and the waveform in FIG. 6, which is not described herein any further.

Figure 4:
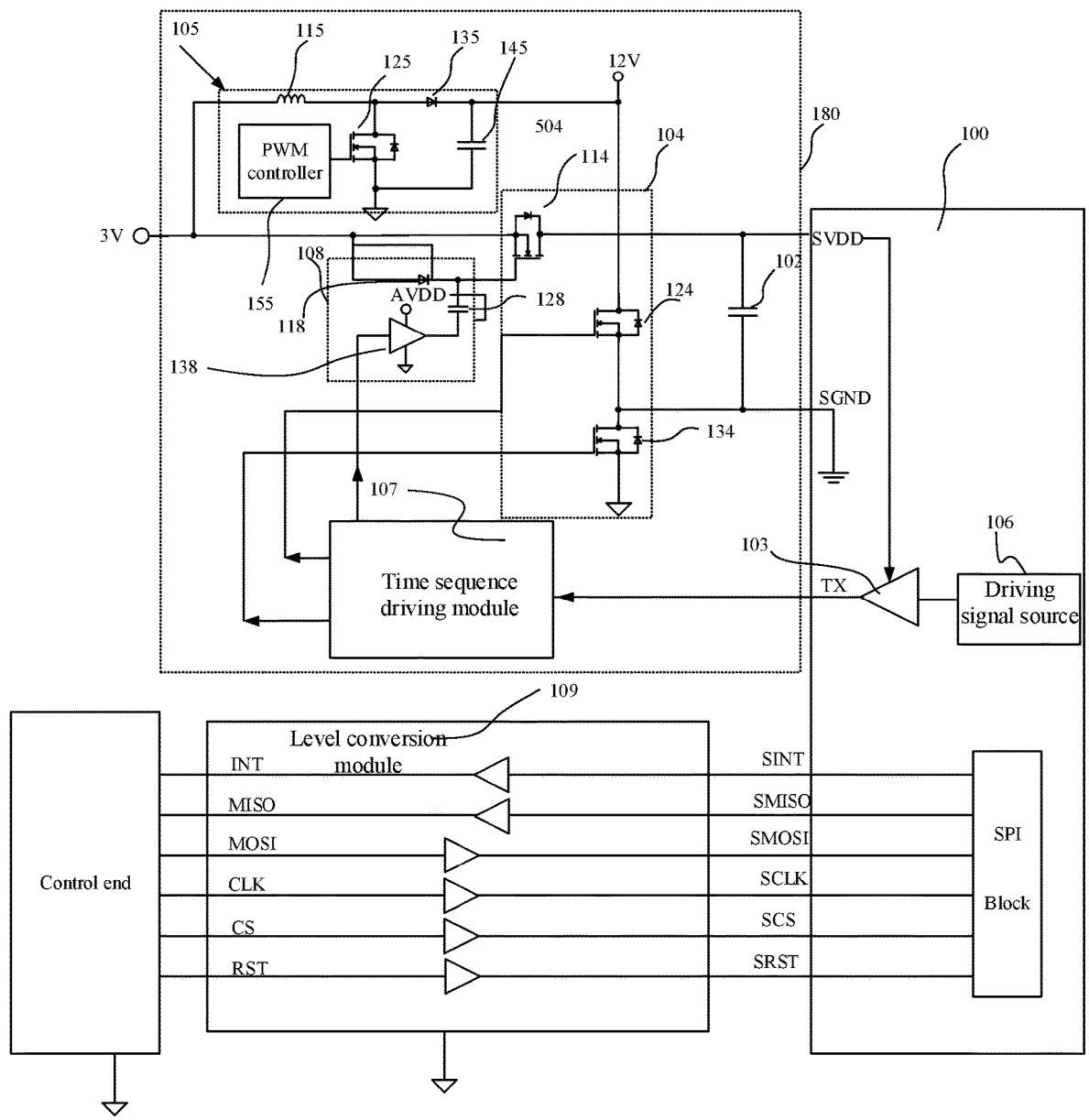
FIG. 4 is a schematic structural diagram of a fingerprint sensor according to the fourth embodiment of the present disclosure.

FIG. 4 is a schematic structural diagram of a fingerprint sensor according to the fourth embodiment of the present disclosure. In the fingerprint sensor as illustrated in FIG. 4, a voltage level conversion module 109 is further added based on the fingerprint sensor as illustrated in FIG. 2, where the voltage level conversion module 109 is configured to convert a communication voltage level for use in data transmission between the fingerprint sensor chip 100 and a communication interface at a control end, such that the converted communication voltage level matches with that of the control end. The communication interfaces include: an interrupt signal (SINT) communication interface, an SPI data read signal (SMISO) communication interface, an SPI data write signal (SMOSI) communication interface, an SPI clock signal (SCLK) communication interface, an SPI chip select signal (SCS) communication signal, a reset signal (SRST) communication interface and the like.

Figure 5:
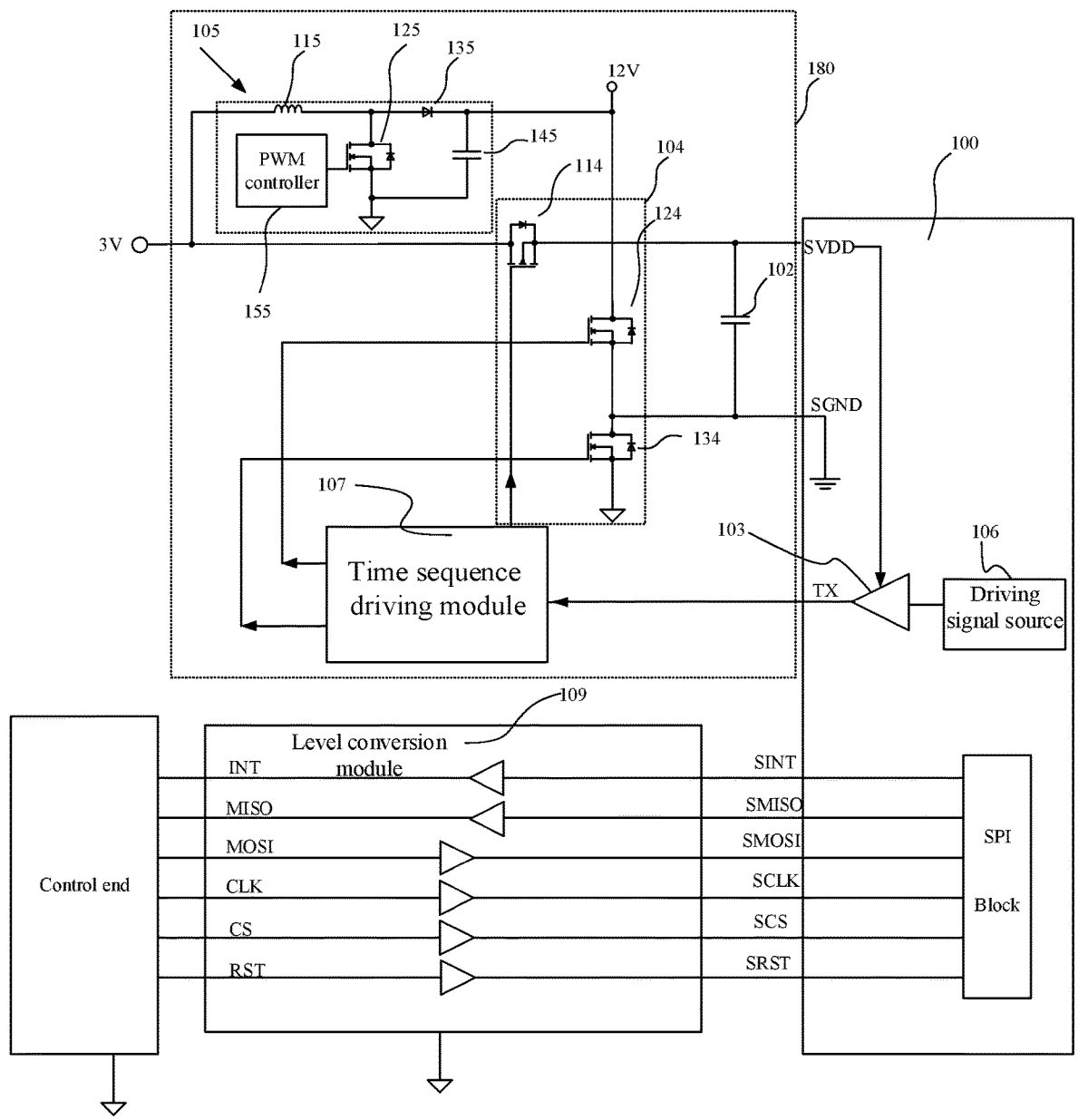
FIG. 5 is a schematic structural diagram of a fingerprint sensor according to the fifth embodiment of the present disclosure.

FIG. 5 is a schematic structural diagram of a fingerprint sensor according to the fifth embodiment of the present disclosure. In the fingerprint sensor as illustrated in FIG. 5, a voltage level conversion module 109 is further added based on the fingerprint sensor as illustrated in FIG. 3, where the voltage level conversion module 109 is configured to convert a communication voltage level for use in data transmission between the fingerprint sensor and a communication interface at a control end, such that the converted voltage communication level matches with the voltage of the control end. Similar to the embodiments as illustrated in FIG. 4, the communication interfaces include: an interrupt signal (SINT) communication interface, an SPI data read signal (SMISO) communication interface, an SPI data write signal (SMOSI) communication interface, an SPI clock signal (SCLK) communication interface, an SPI chip select signal (SCS) communication signal, a reset signal (SRST) communication interface and the like.

It should be noted that in the above embodiments, the scenario where the booster circuit 105 boosts a 3V voltage to a 12V high voltage signal is used as an example; however, in practical products, the booster circuits may also output high voltage signals such as 6V, 9V, 15V, 18V and the like, which may be determined according to actual needs. In addition, it should be understood that the booster circuit 105 is mainly intended to improve the low level of the sensor ground SGND to the 12V high voltage; and in other alternative embodiments, the booster circuit 105 may also be not a mandatory part, and in this case, the sensor ground SGND may still implement the floating ground function.

In addition, the above embodiments are described only using the scenario where the first switch 114 is a PMOS transistor or an NMOS transistor whereas the second switch 124 and the third switch 134 are both NMOS transistors as an example. However, for persons of ordinary skill in the art, under inspiration of the above embodiments, the switches may also be practiced by other semiconductor switch devices, and correspondingly, the time sequence driving module 107 is adjusted to perform time sequence conversion for the driving signal TX according to ON and OFF needs of the other semiconductor switch devices to obtain control signals suitable for controlling ON and OFF states of the other semiconductor switch devices. The details are not given herein any further.

Accordingly, in the fingerprint sensor according to the present application, the floating ground control circuit 180 controls switchover of ON and OFF states of the first switch 114, the second switch 124 and the third switch 134 according to the driving signal TX provided by the fingerprint sensor chip 100, such that the level of the sensor ground SGND of the fingerprint sensor chip 100 is subjected to high voltage floating variations and that the level of the sensor power supply end SVDD is substantially synchronously subjected to high voltage floating variations. In this way, a substantially constant voltage is maintained between the sensor power supply end SVDD and the sensor ground SGND to supply power to the fingerprint sensor chip 100. This finally improves signal-to-noise ratio of a fingerprint image, and overcomes the defect that presence of a cover consequently results in a low signal-to-noise ratio of the fingerprint image in the prior art.

An embodiment of the present disclosure further provides an electronic terminal. The electronic terminal includes the above described fingerprint sensor.

The apparatus according to the embodiments of the present application may be practiced by a computer program. A person skilled in the art should understand the above division of units and modules is only an exemplary one, and if the apparatus is divided into other units or modules or not divided, the technical solution shall also fall within the protection scope of the present application as long as the information object has the above functions.

A person skilled in the art shall understand that the embodiments of the present application may be described to illustrate methods, apparatuses (devices), or computer program products. Therefore, hardware embodiments, software embodiments, or hardware-plus-software embodiments may be used to illustrate the present application. In addition, the present application may further employ a computer program product which may be implemented by at least one non-transitory computer-readable storage medium with an executable program code stored thereon. The non-transitory computer-readable storage medium comprises but not limited to a disk memory, a CD-ROM, and an optical memory.

The present disclosure is described based on the flowcharts and/or block diagrams of the method, apparatus (device), and computer program product. It should be understood that each process and/or block in the flowcharts and/or block diagrams, and any combination of the processes and/or blocks in the flowcharts and/or block diagrams may be implemented using computer program instructions. These computer program instructions may be issued to a computer, a dedicated computer, an embedded processor, or processors of other programmable data processing device to generate a machine, which enables the computer or the processors of other programmable data processing devices to execute the instructions to implement an apparatus for implementing specific functions in at least one process in the flowcharts and/or at least one block in the block diagrams.

These computer program instructions may also be stored a non-transitory computer-readable memory capable of causing a computer or other programmable data processing devices to work in a specific mode, such that the instructions stored on the non-transitory computer-readable memory implement a product comprising an instruction apparatus, where the instruction apparatus implements specific functions in at least one process in the flowcharts and/or at least one block in the block diagrams.

These computer program instructions may also be stored on a computer or other programmable data processing devices, such that the computer or the other programmable data processing devices execute a series of operations or steps to implement processing of the computer. In this way, the instructions, when executed on the computer or the other programmable data processing devices, implement the specific functions in at least one process in the flowcharts and/or at least one block in the block diagrams.

Although the preferred embodiments of the present application are described above, once knowing the basic creative concept, a person skilled in the art can make other modifications and variations to these embodiments. Therefore, the appended claims are intended to be construed as covering the preferred embodiments and all the modifications and variations falling within the scope of the present application. Obviously, a person skilled in the art can make various modifications and variations to the present application without departing from the spirit and scope of the present application. In this way, the present application is intended to cover the modifications and variations if they fall within the scope of the appended claims of the present application and equivalent technologies thereof.

What is claimed is:

1. A fingerprint sensor, comprising:
a fingerprint sensor chip; and
a floating ground control circuit;
the fingerprint sensor chip comprising: a sensor array having a plurality of sensing electrodes, the sensing electrodes configured to form a fingerprint capacitor with a finger; a driver configured to output a driving signal to the floating ground control circuit; a sensor power supply end connected to the floating ground control circuit and configured to receive a high potential output from the floating ground control circuit; and a sensor ground connected to the floating ground control circuit and configured to receive a low potential output from the floating ground control circuit;
the floating ground control circuit comprising: a booster circuit connected to a power supply, configured to boost a voltage output by the power supply and generate a high voltage signal to be provided to the sensor ground; and a switch circuit comprising: a first switch arranged between the power supply and the sensor power supply end, wherein the sensor power supply end is connected to the power supply when the first switch is turned on such that the voltage output by the power supply is provided to the sensor power supply; a second switch arranged between a booster circuit and the sensor ground, wherein the sensor ground is connected to the booster circuit when the second switch is turned on such that the high voltage generated by the booster circuit is provided to the sensor ground; and a third switch arranged between a device ground and the sensor ground, wherein:
a first control signal, a second control signal, and a third control signal are generated from the driving signal, and configured to respectively control the first switch, the second switch, and the third switch;
the first switch and the third switch are configured to switch ON and OFF states synchronously, and the ON and OFF states of the second switch and the ON and OFF states of the first switch and the third switch are opposite, such that the low potential supplied to the sensor ground and the high potential supplied to the sensor power supply end vary synchronously.

2. The fingerprint sensor according to claim 1, wherein the floating ground control circuit further comprises an energy storage capacitor connected between the sensor power supply end and the sensor ground, and configured to cause the high potential supplied to the power supply input terminal and the low potential of the sensor ground to maintain a synchronous variation state, such that a constant voltage is supplied to the fingerprint sensor chip.

3. The fingerprint sensor according to claim 2, wherein the switch circuit periodically outputs the voltage output by the power supply to the sensor power supply end by switching between the ON and OFF states, and periodically supplies the high voltage signal output by the booster circuit to the sensor ground by switching between the ON and OFF states, to obtain the sensor ground with a floating high voltage.

4. The fingerprint sensor according to claim 2, wherein the booster circuit comprises an inductor, a switch transistor, a diode, a filter capacitor and a PWM controller; wherein the PWM controller is configured to generate a pulse width modulation signal and output the pulse width modulation signal to the switch transistor to control ON and OFF states of the switch transistor; wherein the switch transistor is a MOS transistor, a gate of the MOS transistor is connected to the PWM controller and a source of the MOS transistor is connected to the device ground; a drain of the switch transistor is connected to the power supply via the inductor, and to an anode of the diode; and a cathode of the diode serves as an output terminal of the booster circuit and connected to the switch circuit, and is connected to the device ground via the filter capacitor.

5. The fingerprint sensor according to claim 1, wherein the fingerprint sensor chip further comprises a driving signal source configured to generate and output the driving signal to the floating ground control circuit via the driver.

6. The fingerprint sensor according to claim 1, wherein the floating ground control circuit comprises a time sequence driving module connected between the driver and the switch circuit, and configured to receive and convert the driving signal to generate the first control signal, the second control signal, and the third control signal.

7. The fingerprint sensor according to claim 6, wherein the time sequence driving module is configured to convert the driving signal into the first control signal, the second control signal and the third control signal via time sequence conversion, and respectively control the first switch, the second switch and the third switch via different control ports.

8. The fingerprint sensor according to claim 7, wherein the floating ground control circuit further comprises a bootstrap driving circuit configured to receive the first control signal output by the time sequence driving module, and drive the first switch to control the first switch based on the first control signal.

9. The fingerprint sensor according to claim 8, wherein the first switch is a first NMOS transistor; wherein the bootstrap driving circuit is connected to a gate of the first NMOS transistor, and configured to receive the first control signal output by the time sequence driving module, and drive the first NMOS transistor to control the first NMOS transistor based on the first control signal; a source of the first NMOS transistor is connected to the power supply, and configured to receive a voltage supplied by the power supply; and a drain of the first NMOS transistor is connected to the sensor power supply end of the fingerprint sensor chip.

10. The fingerprint sensor according to claim 9, wherein the bootstrap driving circuit comprises a diode, a second energy storage capacitor and an amplifier; wherein the diode is arranged between the source and the gate of the first NMOS transistor, one of two terminals of the second energy storage capacitor is connected to the gate of the first NMOS transistor, the other terminal of the second energy storage capacitor is connected to an output terminal of the amplifier, and an input terminal of the amplifier is connected to the first control signal.

11. The fingerprint sensor according to claim 6, wherein the second switch is a second NMOS transistor; wherein a gate of the second NMOS transistor is connected to the time sequence driving module, and configured to receive the second control signal output by the time sequence driving module; and a source of the second NMOS transistor is connected to the sensor ground of the fingerprint sensor chip, and a drain of the second NMOS transistor is connected to an output terminal of the booster circuit to receive the high voltage signal output by the booster circuit.

12. The fingerprint sensor according to claim 6, wherein the third switch is a third NMOS transistor; wherein a gate of the third NMOS transistor is connected to the time sequence driving module, and configured to receive the third control signal output by the time sequence driving module; and a source of the third NMOS transistor is connected to the device ground, and a drain of the third NMOS transistor is connected to the sensor ground of the fingerprint sensor chip.

13. The fingerprint sensor according to claim 1, wherein the first switch is a PMOS transistor; wherein a drain of the PMOS transistor is connected to the power supply to receive the voltage, and a source of the PMOS transistor is connected to the sensor power supply end.

14. The fingerprint sensor according to claim 1, further comprising a voltage level conversion module configured to convert a communication voltage level for use in data transmission between the fingerprint sensor chip and a communication interface at a control end, such that the converted communication voltage level matches with a communication voltage level of the control end.

15. An electronic terminal, comprising a fingerprint sensor, the fingerprint sensor comprising a fingerprint sensor chip and a floating ground control circuit;
the fingerprint sensor chip comprising: a sensor array having a plurality of sensing electrodes, the sensing electrode configured to form a fingerprint capacitor with a finger, a driver configured to output a driving signal to the floating ground control circuit; a sensor power supply end connected to the floating ground control circuit and configured to receive a high potential output from the floating ground control circuit; and a sensor ground connected to the floating ground control circuit and configured to receive a low potential output from the floating ground control circuit; and the floating ground control circuit comprising: a booster circuit connected to a power supply, configured to boost a voltage output by the power supply and generate a high voltage signal to be provided to the sensor ground; and a switch circuit comprising: a first switch arranged between the power supply and the sensor power supply end, wherein the sensor power supply end is connected to the power supply when the first switch is turned on such that the voltage output by the power supply is provided to the sensor power supply; a second switch arranged between a booster circuit and the sensor ground, wherein the sensor ground is connected to the booster circuit when the second switch is turned on such that the high voltage signal generated by the booster circuit is provided to the sensor ground; and a third switch arranged between a device ground and the sensor ground;

wherein:

a first control signal, a second control signal, and a third control signal are generated from the driving signal, and configured to respectively control the first switch, the second switch, and the third switch;

the first switch and the third switch are configured to switch ON and OFF states synchronously, and the ON and OFF states of the second switch and the ON and OFF states of the first switch and the third switch are opposite, such that the low potential supplied to the sensor ground and the high potential supplied to the sensor power supply end vary synchronously.

* * * * *